United States Patent
Hirotomi

(10) Patent No.: US 9,908,586 B2
(45) Date of Patent: Mar. 6, 2018

(54) BICYCLE RIM BRAKE

(71) Applicant: Shimano Inc., Sakai, Osaka (JP)

(72) Inventor: Shinya Hirotomi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/642,253

(22) Filed: Mar. 9, 2015

(65) Prior Publication Data
US 2016/0264212 A1   Sep. 15, 2016

(51) Int. Cl.
*B62L 1/14* (2006.01)
*B62L 3/02* (2006.01)
*B62L 1/12* (2006.01)
*B62L 1/16* (2006.01)

(52) U.S. Cl.
CPC ............. *B62L 3/023* (2013.01); *B62L 1/12* (2013.01); *B62L 1/16* (2013.01)

(58) Field of Classification Search
CPC . B60T 1/06; B60T 7/102; B62L 1/005; B62L 1/10; B62L 1/14; B62L 1/16; B62L 3/02; B62L 3/023; F16D 65/14; F16D 2121/02; F16D 2127/02; F16D 65/18; F16D 65/22; F16D 2125/06; F16D 2121/16; F16D 51/00; F16D 2200/0034; F16D 2250/0038; F16D 2250/0076; F16J 15/164; F16J 15/3204; F16J 15/3216; B10T 11/16; B10T 11/20; B10T 8/4095
USPC ....... 188/27.19, 79.58, 344, 196 BA, 196 M, 188/345, 349, 24.11–24.22
See application file for complete search history.

(56) References Cited

U.S. PATENT DOCUMENTS

| | | | | |
|---|---|---|---|---|
| 2,603,952 A | * | 7/1952 | Dodge | F16D 65/22 188/152 |
| 3,554,334 A | * | 1/1971 | Shimano | B62L 3/023 188/24.16 |
| 4,301,894 A | * | 11/1981 | Arai | B62L 1/12 188/216 |
| 4,793,444 A | * | 12/1988 | Nagano | B62L 1/16 188/24.12 |

(Continued)

FOREIGN PATENT DOCUMENTS

| | | |
|---|---|---|
| DE | 33 03 586 A1 | 8/1984 |
| DE | 33 25 970 A1 | 1/1985 |

(Continued)

*Primary Examiner* — Robert A. Siconolfi
*Assistant Examiner* — San M Aung
(74) *Attorney, Agent, or Firm* — Global IP Counselors, LLP

(57) ABSTRACT

A bicycle rim brake is basically provided with a first brake arm and a hydraulic actuation device. The first brake arm includes a first coupling portion configured to pivot about a first pivot axis, a first actuated portion and a first mounting portion. The first mounting portion is configured to mount a first friction member and extends from the first coupling portion. The hydraulic actuation device is operatively coupled to the first actuated portion of the first brake arm. The hydraulic actuation device includes a cylinder housing defining a hydraulic chamber, a first piston movably disposed in the hydraulic chamber of the cylinder housing, and a first sealing member provided on the cylinder housing so as to at least partially support the first piston in the hydraulic chamber.

20 Claims, 15 Drawing Sheets

(56) References Cited

U.S. PATENT DOCUMENTS

| | | | | |
|---|---|---|---|---|
| 5,076,593 A | * | 12/1991 | Sullivan | F16D 65/18 |
| | | | | 188/196 P |
| 5,269,549 A | * | 12/1993 | Wilson | B62K 21/02 |
| | | | | 280/276 |
| 7,677,365 B2 | | 3/2010 | Nago | |
| 2004/0007431 A1 | * | 1/2004 | Barbosa | F16D 51/52 |
| | | | | 188/72.4 |
| 2005/0173215 A1 | * | 8/2005 | Watarai | B62L 1/005 |
| | | | | 188/370 |
| 2011/0011684 A1 | * | 1/2011 | Tetsuka | B60T 1/06 |
| | | | | 188/24.22 |
| 2013/0112510 A1 | | 5/2013 | Jordan et al. | |

FOREIGN PATENT DOCUMENTS

| | | | | |
|---|---|---|---|---|
| DE | 3618980 A1 | * | 12/1987 | B62L 3/023 |
| DE | 3618980 A1 | * | 12/1987 | B62L 3/023 |
| DE | 4222505 A1 | * | 1/1994 | B62L 1/00 |
| DE | 4222505 A1 | * | 1/1994 | B62L 1/00 |

\* cited by examiner

BICYCLE RIM BRAKE

BACKGROUND

Field of the Invention

This invention generally relates to a bicycle rim brake. More specifically, the present invention relates to a bicycle rim brake that includes a hydraulic actuation device for applying an actuating force to move at least one brake arm to a braking position.

Background Information

Bicycles are typically provided with at least one brake device for stopping. Currently, a wide variety of bicycle brake devices are available. One popular type of bicycle brake device is a rim brake. Rim brakes are configured to apply a braking force to the wheel of a bicycle by pinching the rim of the wheel with a pair of brake shoes attached to a pair of brake arms. Rim brakes are available in several configurations. For example, rim brakes include a side pull type, a center pull type and a dual-pivot. Examples of rim brakes are disclosed in U.S. Pat. No. 7,677,365, which is assigned to Shimano Inc. These rim brakes are operated using a Bowden cable. More recently, hydraulically operated rim brakes have been proposed.

SUMMARY

Generally, the present disclosure is directed to various features of a bicycle rim brake. In one feature, a bicycle rim brake is provided in which the clearance between the friction member and the rim can be automatically adjusted.

In view of the state of the known technology and in accordance with a first aspect of the present disclosure, a bicycle rim brake is provided that basically comprises a first brake arm and a hydraulic actuation device. The first brake arm includes a first coupling portion configured to pivot about a first pivot axis, a first actuated portion and a first mounting portion. The first mounting portion is configured to mount a first friction member and extends from the first coupling portion. The hydraulic actuation device is operatively coupled to the first actuated portion of the first brake arm. The hydraulic actuation device includes a cylinder housing defining a hydraulic chamber, a first piston movably disposed in the hydraulic chamber of the cylinder housing, and a first sealing member provided on the cylinder housing so as to at least partially support the first piston in the hydraulic chamber.

In accordance with a second aspect of the present invention, the bicycle rim brake according to the first aspect is configured so that the cylinder housing has a first annular recess, and the first sealing member is disposed in the first annular recess and partially from the first annular recess so as to support the first piston.

In accordance with a third aspect of the present invention, the bicycle rim brake according to the first aspect is configured so that the first actuated portion and the first mounting portion are disposed on opposite sides of the first coupling portion.

In accordance with a fourth aspect of the present invention, the bicycle rim brake according to the first aspect further comprises a second brake arm including a second coupling portion configured to pivot about a second pivot axis, a second actuated portion and a second mounting portion, the second mounting portion being configured to mount a second friction member and extends from the second coupling portion.

In accordance with a fifth aspect of the present invention, the bicycle rim brake according to the fourth aspect is configured so that the first actuated portion and the first mounting portion are disposed on opposite sides of the first coupling portion, and the second actuated portion and the second mounting portion are disposed on opposite sides of the second coupling portion.

In accordance with a sixth aspect of the present invention, the bicycle rim brake according to the fourth aspect is configured so that the hydraulic actuation device further includes a second piston movably disposed in the hydraulic chamber of the cylinder housing, and a second sealing member provided on the cylinder housing so as to at least partially support the second piston in the hydraulic chamber.

In accordance with a seventh aspect of the present invention, the bicycle rim brake according to the sixth aspect is configured so that the cylinder housing has a first annular recess and a second annular recess, the first sealing member is disposed in the first annular recess and protrudes from the first annular recess so as to support the first piston, and the second sealing member is disposed in the second annular recess and protrudes from the second annular recess so as to support the second piston.

In accordance with an eighth aspect of the present invention, the bicycle rim brake according to the sixth aspect is configured so that the first piston is operatively coupled to the first actuated portion of the first brake arm, and the second piston is operatively coupled to the second actuated portion of the second brake arm.

In accordance with a ninth aspect of the present invention, the bicycle rim brake according to the sixth aspect is configured so that the first sealing member is an O-ring made of an elastic material, and the second sealing member is an O-ring made of an elastic material.

In accordance with a tenth aspect of the present invention, the bicycle rim brake according to the ninth aspect is configured so that the first sealing member has a rectangularly shaped cross-sectional profile with a cylindrical inner surface contacting the first piston, and the second sealing member has a rectangularly shaped cross-sectional profile with a cylindrical inner surface contacting the second piston.

In accordance with an eleventh aspect of the present invention, the bicycle rim brake according to the sixth aspect is configured so that the first annular recess has a trapezoidaly shaped cross-sectional profile which has a first outer surface that expands in diameter as the first outer surface approaches toward the first actuated portion of the first brake arm, and the second annular recess has a trapezoidaly shaped cross-sectional profile which has a second outer surface that expands in diameter as the second outer surface approaches toward the second actuated portion of the second brake arm.

In accordance with a twelfth aspect of the present invention, the bicycle rim brake according to the fourth aspect further comprises a support member coupled to the first and second coupling portions and maintains the first and second pivot axes at a prescribed distance apart from each other.

In accordance with a thirteenth aspect of the present invention, the bicycle rim brake according to the fourth aspect is configured so that the first coupling portion includes a first mounting fastener that is configured to be mounted to a bicycle and the second coupling portion includes a second mounting fastener that is configured to be mounted to the bicycle.

In accordance with a fourteenth aspect of the present invention, the bicycle rim brake according to the thirteenth aspect further comprises a first return spring biasing the first brake arm about the first pivot axis towards the first piston, and a second return spring biasing the second brake arm about the second pivot axis towards the second piston.

In accordance with a fifteenth aspect of the present invention, the bicycle rim brake according to the fourteenth aspect further comprises a first adjustment member arranged to adjust a biasing force of the first return spring, and a second adjustment member arranged to adjust a biasing force of the second return spring independently of the first adjustment member.

In accordance with a sixteenth aspect of the present invention, the bicycle rim brake according to the first aspect further comprises a first return spring biasing the first brake arm about the first pivot axis towards the first piston.

In accordance with a seventeenth aspect of the present invention, the bicycle rim brake according to the sixteenth aspect further comprises a first adjustment member arranged to adjust a biasing force of the first return spring.

In accordance with an eighteenth aspect of the present invention, the bicycle rim brake according to the second aspect is configured so that the first sealing member is an O-ring made of an elastic material.

In accordance with a nineteenth aspect of the present invention, the bicycle rim brake according to the eighteenth aspect is configured so that the first sealing member has a rectangularly shaped cross-sectional profile with a cylindrical inner surface contacting the first piston.

In accordance with a twentieth aspect of the present invention, the bicycle rim brake according to the second aspect is configured so that the first annular recess has a trapezoidaly shaped cross-sectional profile which has a first outer surface that expands in diameter as the first outer surface approaches toward the first actuated portion of the first brake arm.

Also other objects, features, aspects and advantages of the disclosed bicycle rim brake will become apparent to those skilled in the art from the following detailed description, which, taken in conjunction with the annexed drawings, discloses one embodiment of the bicycle rim brake.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
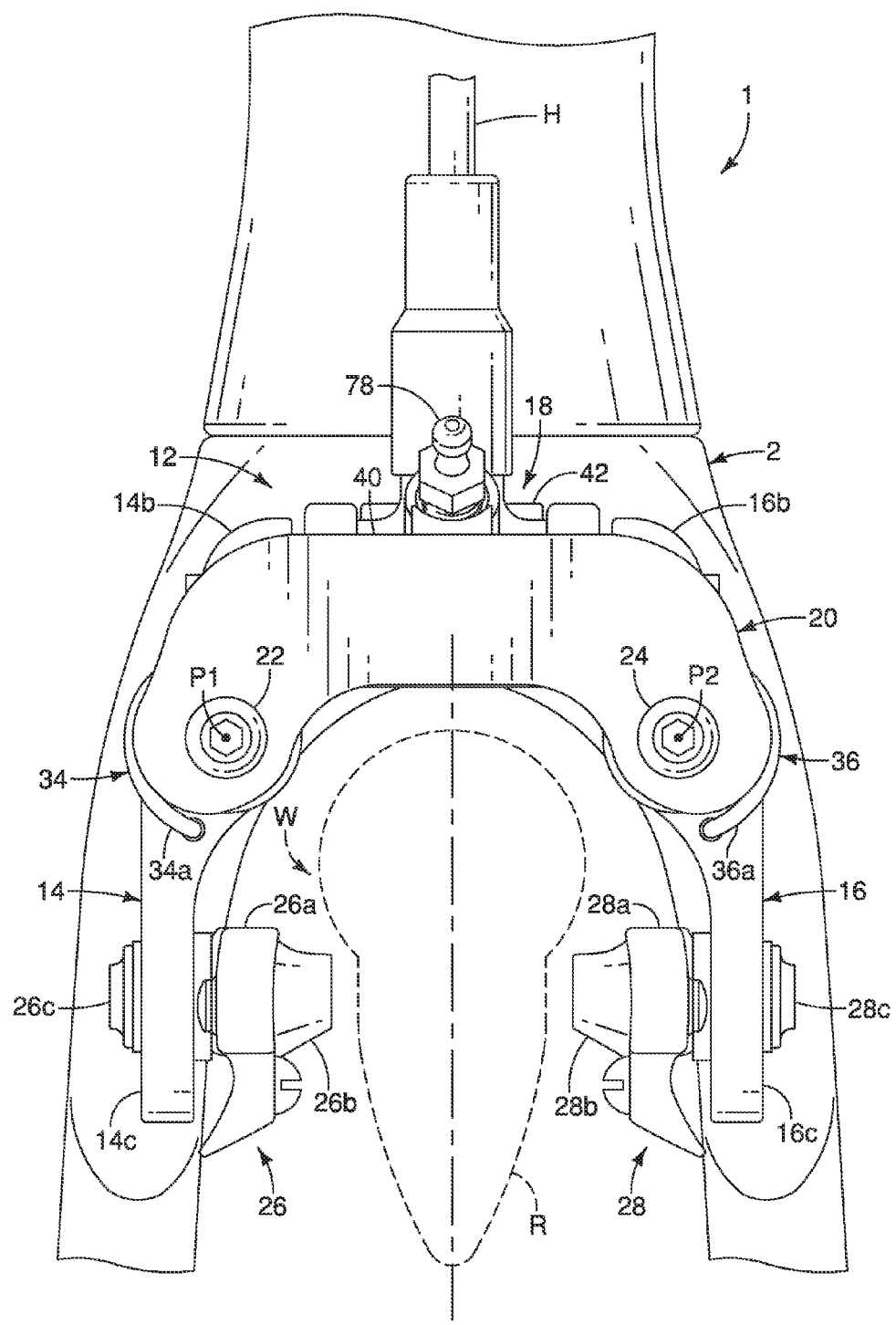
FIG. 1 is a front elevational view of a portion of a bicycle equipped with a bicycle rim brake in accordance with a first embodiment, with the bicycle rim brake being in a non-braking position or resting position.

Referring initially to FIG. 1, a portion of a bicycle 1 having a front fork 2 is illustrated that is equipped with a bicycle rim brake 12 in accordance with a first embodiment. The bicycle rim brake 12 is installed on the front fork 2 such that the bicycle rim brake 12 straddles a bicycle rim R of a front wheel W. Of course, it will be apparent to those skilled in the bicycle field from this disclosure that the bicycle rim brake 12 can be used in conjunction with a rear bicycle wheel.

The bicycle rim brake 12 basically comprises a first brake arm 14, a second brake arm 16 and a hydraulic actuation device 18. While the first embodiment uses two brake arms, the bicycle rim brake 12 could be constructed with one a single brake arm if needed and/or desired. In the first embodiment, the bicycle rim brake 12 is hydraulically actuated by a conventional hydraulic actuation device (e.g., a brake lever), which is not shown. The bicycle rim brake 12 further comprises a support member 20. The first and second brake arms 14 and 16 are pivotally supported on the support member 20. In particular, the first brake arm 14 is pivotally supported on the support member 20 by a first mounting fastener 22 that is configured to be mounted to the front fork 2 of the bicycle 1. The first mounting fastener 22 defines a first pivot axis P1 of the first brake arm 14. Similarly, the second brake arm 16 is pivotally supported on the support member 20 by a second mounting fastener 24 that is configured to be mounted to the front fork 2 of the bicycle 1. The second mounting fastener 24 defines a second pivot axis P2 of the first brake arm 14.

Figure 2:
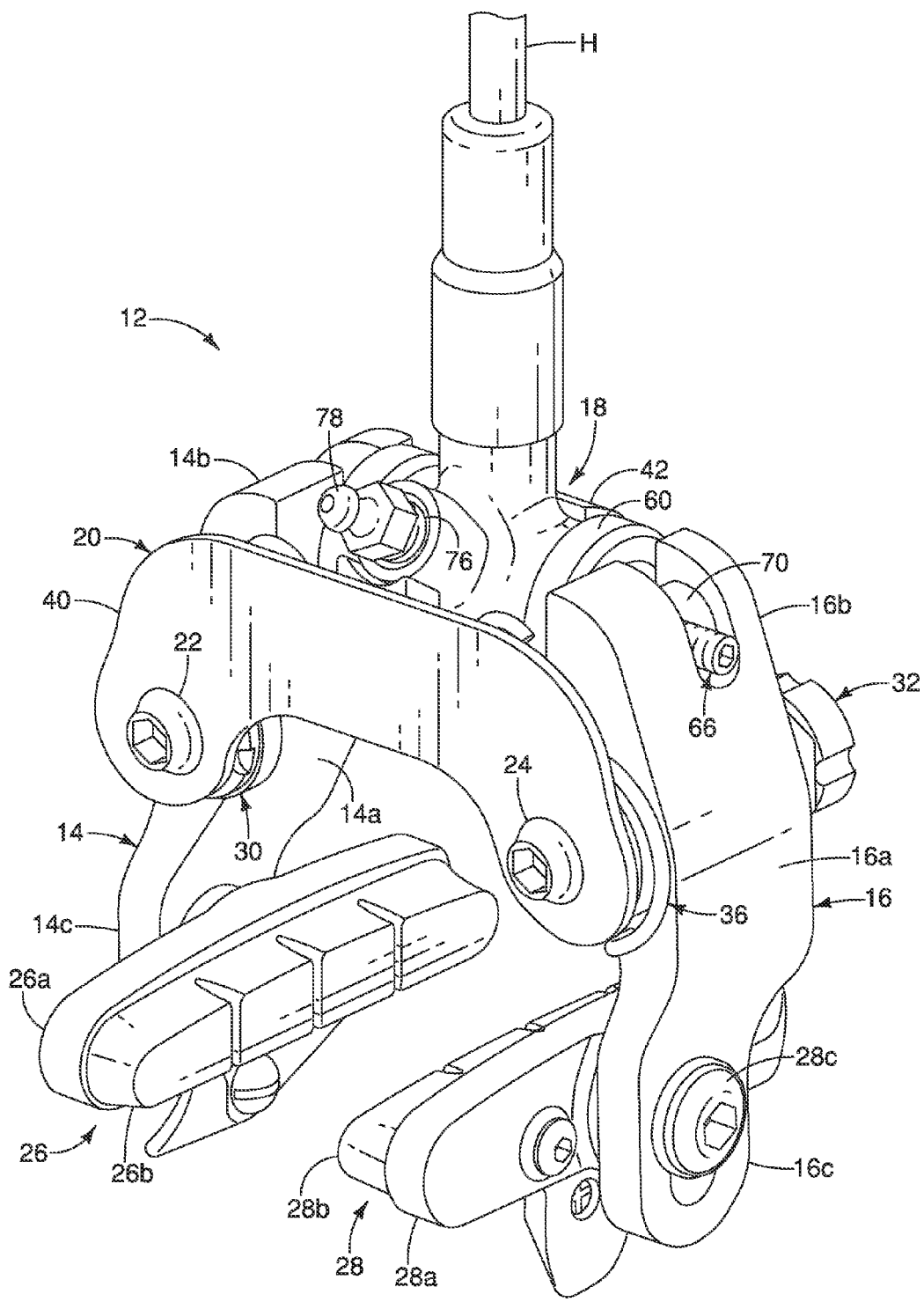
FIG. 2 is a front perspective view of the bicycle rim brake illustrated in FIG. 1 with the bicycle rim brake being in the non-braking position.
Figure 3:
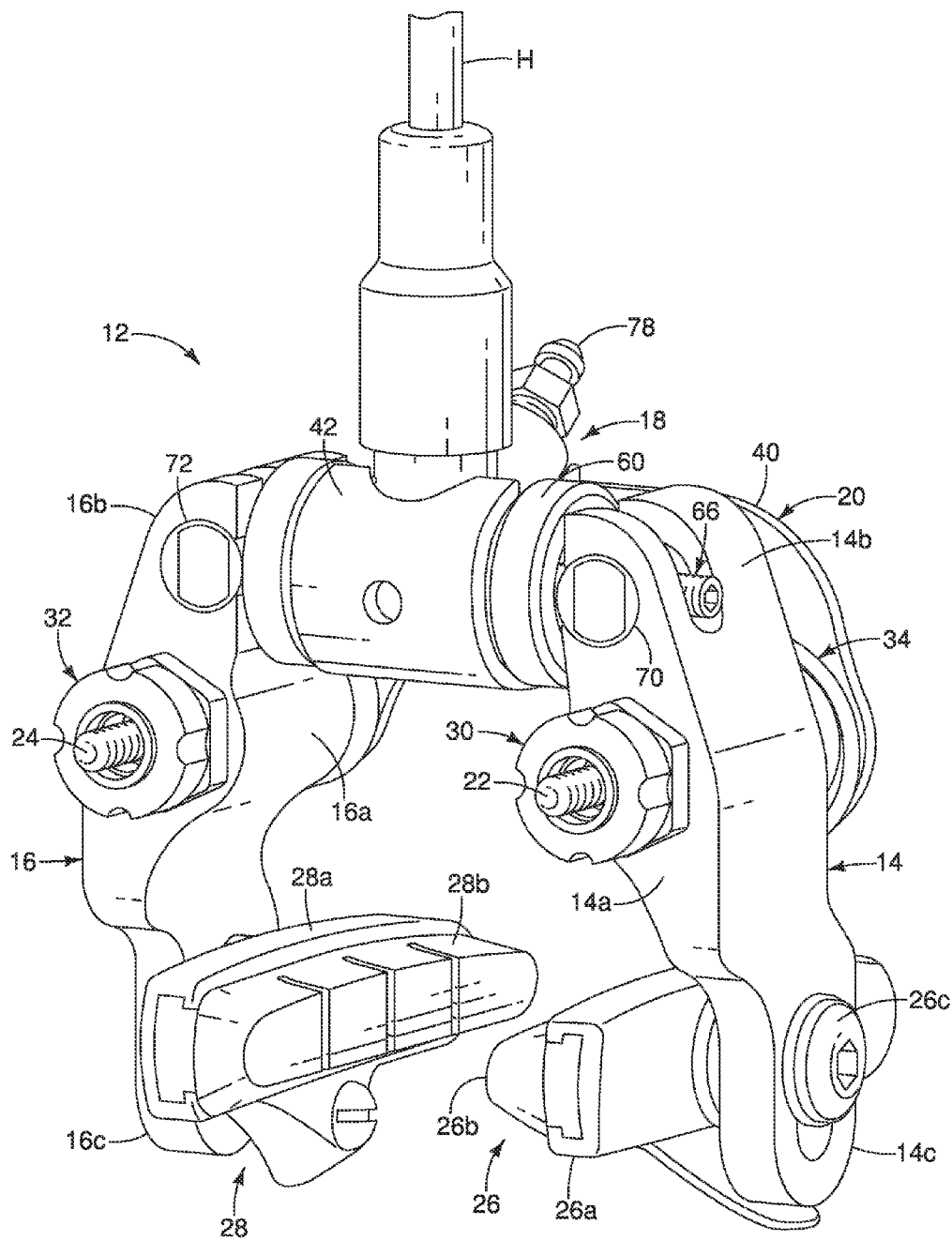
FIG. 3 is a rear perspective view of the bicycle rim brake illustrated in FIGS. 1 and 2 with the bicycle rim brake being in the non-braking position.
Figure 6:
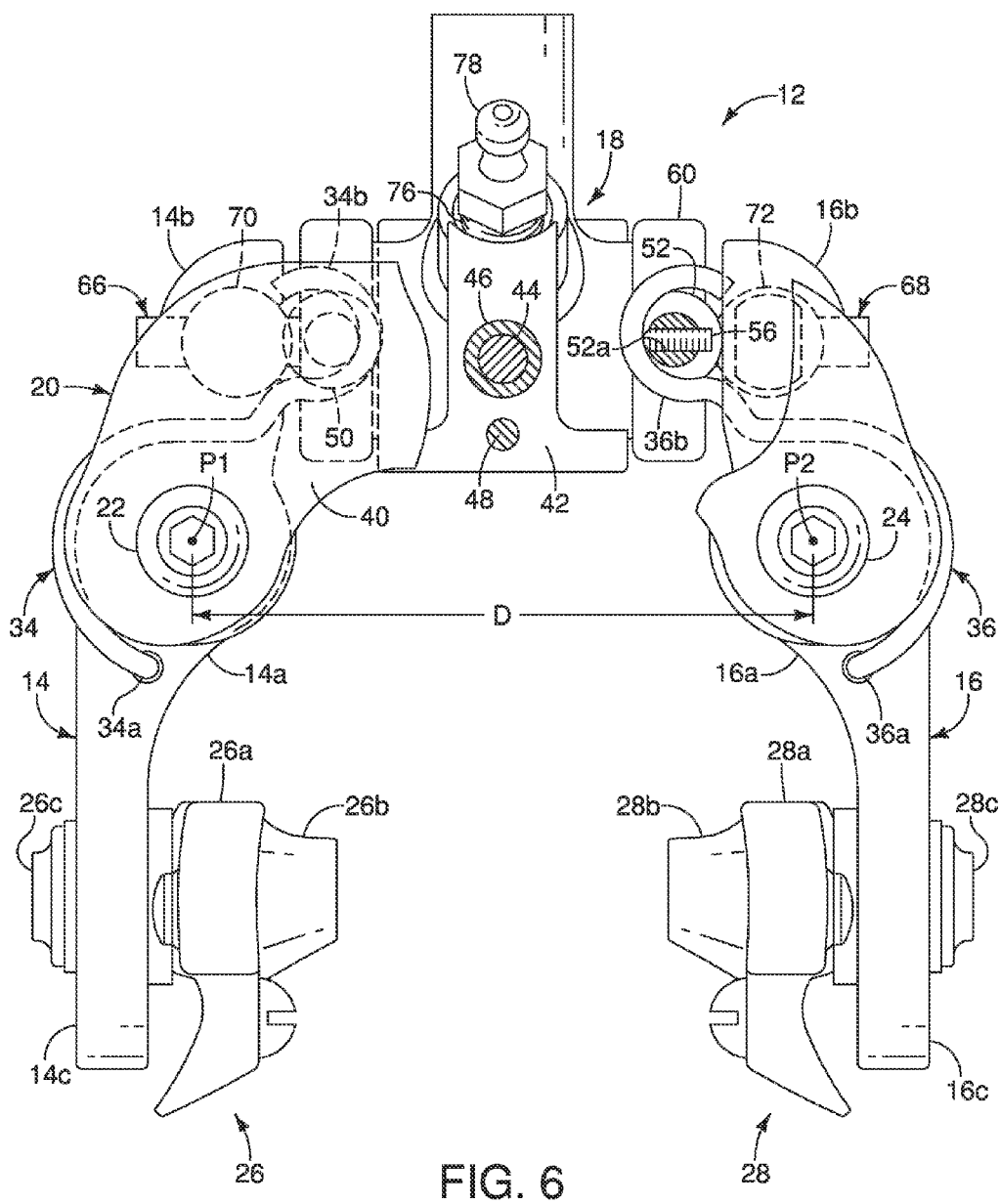
FIG. 6 is a front elevational view of the bicycle rim brake illustrated in FIGS. 1 to 5 with a portion of the support member of the bicycle rim brake broken away to reveal the spring arrangement.
Figure 7:
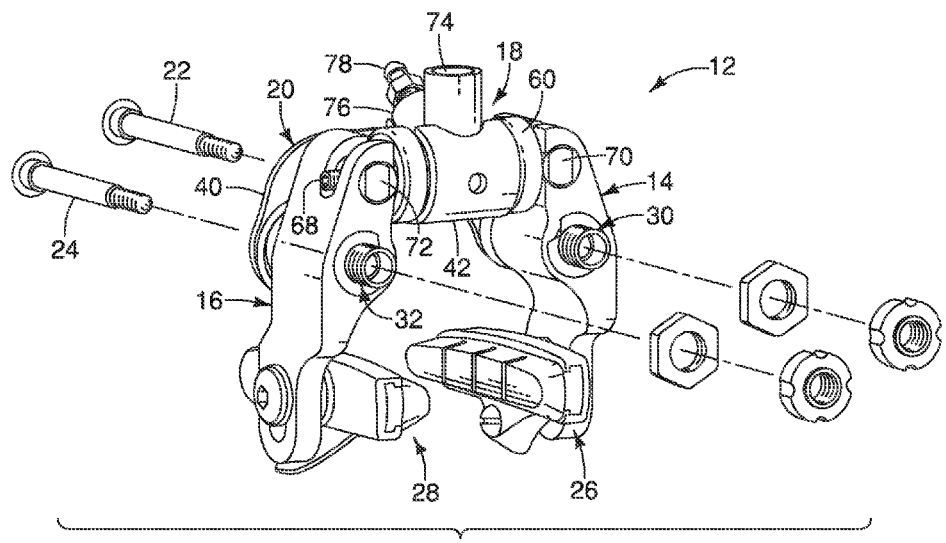
FIG. 7 is a partially exploded perspective view of the bicycle rim brake illustrated in FIGS. 1 to 6.

As seen from FIGS. 2, 3 and 6, the hydraulic actuation device 18 is mounted on the support member 20. The hydraulic actuation device 18 is fluidly connected to a first end of a hydraulic hose H. The hydraulic hose H further has a second end (not shown) connected to a conventional hydraulic actuating device (not shown). During a braking operation, hydraulic fluid is forced into the hydraulic actuation device 18 causing the hydraulic actuation device 18 to push the first and second brake arms 14 and 16 for applying a braking force to the bicycle rim R.

The hydraulic actuation device 18 is operatively coupled between the first and second brake arms 14 and 16, and arranged to pivot the first and second brake arms 14 and 16 about the first and second pivot axes P1 and P2, respectively. Thus, actuation of the hydraulic actuation device 18 causes the first and second brake arms 14 and 16 to move from a non-braking position or resting position to a braking position or actuated position as the first and second brake arms 14 and 16 pivot about the first and second pivot axes P1 and P2, respectively. The pivotal movements of the first and second brake arms 14 and 16 about the first and second pivot axes P1 and P2, respectively, apply a braking force to the bicycle wheel W by pinching the bicycle rim R of the bicycle wheel W.

Now, the first and second brake arms 14 and 16 will be discussed in more detail. The first and second brake arms 14 and 16 are each a rigid member made of a suitable rigid material that is typically used for bicycle brake arms. For example, the first and second brake arms 14 and 16 can be a cold-forged aluminum arm or a carbon fiber reinforced arm. As seen from the view in FIG. 1, the first brake arm 14 pivots about the first pivot axis P1 in a counterclockwise direction to contact the bicycle rim R, while the second brake arm 16 pivots about the second pivot axis P2 in a clockwise direction to contact the bicycle rim R. Thus, the first brake arm 14 pivots about the first pivot axis P1 in a clockwise direction to move away from the bicycle rim R, while the second brake arm 16 pivots about the second pivot axis P2 in a counterclockwise direction to move away from the bicycle rim R.

Figure 4:
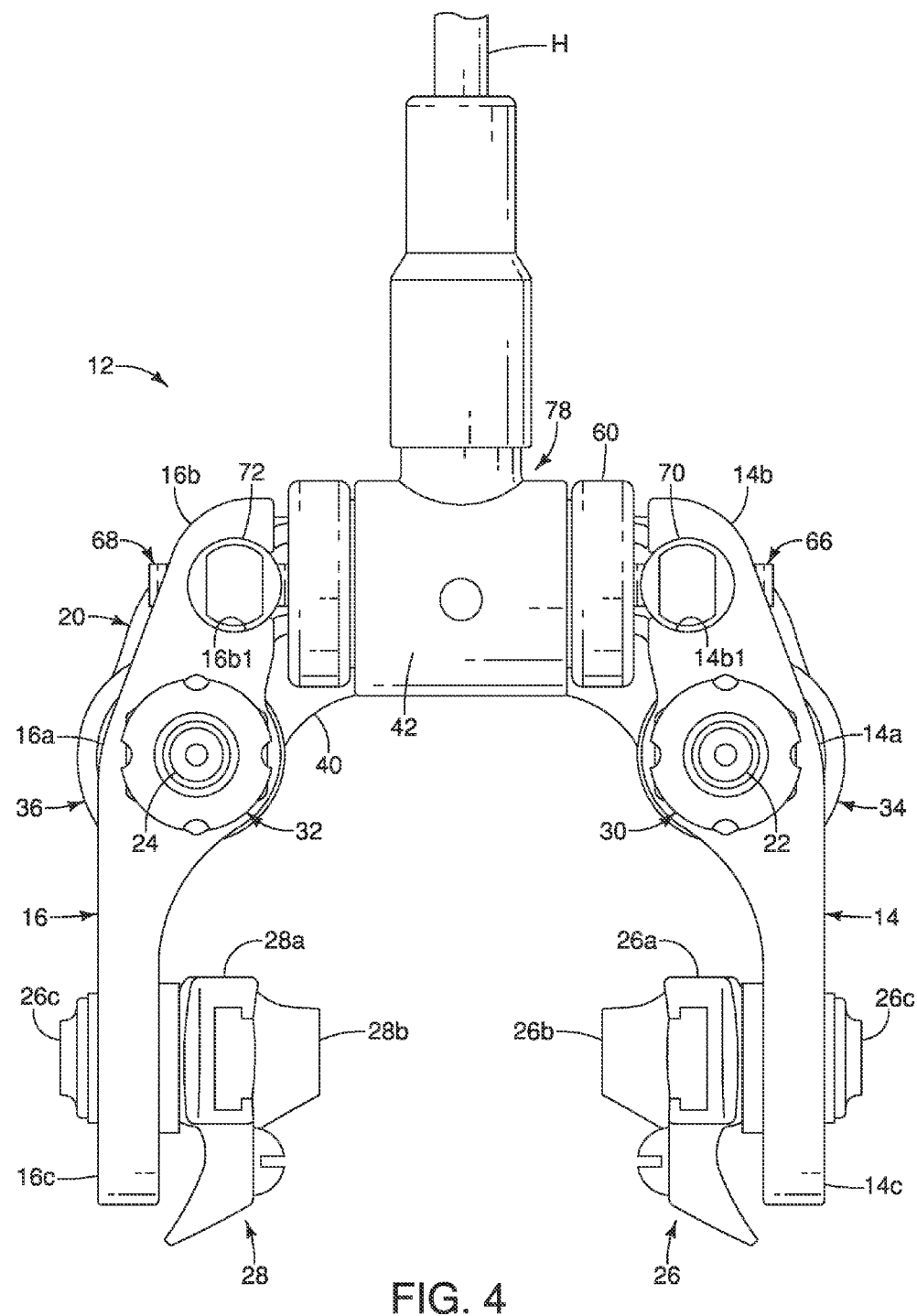
FIG. 4 is a rear elevational view of the bicycle rim brake illustrated in FIGS. 1 to 3 with the bicycle rim brake being in the non-braking position.

As seen in FIGS. 3 and 4, the first brake arm 14 basically has a first coupling portion 14a, a first actuated portion 14b and a first mounting portion 14c. The first actuated portion 14b and the first mounting portion 14c are disposed on opposite sides of the first coupling portion 14a. The first coupling portion 14a includes the first mounting fastener 22 that is configured to be mounted to the bicycle 1. Thus, the first coupling portion 14a is configured to pivot about the first pivot axis P1. The first actuated portion 14b extends from the first coupling portion 14a, and is operatively coupled to the hydraulic actuation device 18. The first mounting portion 14c extends from the first coupling portion 14a, and is configured to mount a first friction member 26. In the first embodiment, as seen in FIG. 3, the first mounting portion 14c includes a slot (elongated opening) for adjustably attaching the first friction member 26. In the first embodiment, the first friction member 26 is a conventional brake shoe that is detachably attached to the first mounting portion 14b in a conventional manner. Basically, the first friction member 26 includes a brake pad holder 26a and a brake pad or shoe 26b. The brake pad holder 26a supports the brake pad 26b, and is attached in the slot formed in the first mounting portion 14c by a mounting bolt 26c. The brake pad 26b of the first friction member 26 contacts one side of the bicycle rim R during a braking operation.

Similarly, the second brake arm 16 basically has a second coupling portion 16a, a second actuated portion 16b and a second mounting portion 16c. The second actuated portion 16b and the second mounting portion 16c are disposed on opposite sides of the second coupling portion 16a. The second coupling portion 16a includes the second mounting fastener 24 that is configured to be mounted to the bicycle 1. Thus, the second coupling portion 16a is configured to pivot about the second pivot axis P2. The second mounting portion 16c extends from the second coupling portion 16a, and is configured to mount a second friction member 28. In the first embodiment, as seen in FIG. 2, the second mounting portion 16c includes a slot (elongated opening) for adjustably attaching the second friction member 28. In the first embodiment, the second friction member 28 is a conventional brake shoe that is detachably attached to the second mounting portion 16b in a conventional manner. Basically, the second friction member 28 includes a brake pad holder 28a and a brake pad or shoe 28b. The brake pad holder 28a supports the brake pad 28b, and is attached in a slot formed in the second mounting portion 16c by a mounting bolt 28c. The brake pad 28b of the second friction member 28 contacts the other side of the bicycle rim R during a braking operation.

In the first embodiment, each of the first coupling portion 14a and the second coupling portion 16a is preferably provided with a bushing and/or bearing structure for pivotally supporting the first and second brake arms 14 and 16 on the first and second fasteners 22 and 24. Here, the first coupling portion 14a further includes a first brake arm supporting unit 30 for rotatably supporting the first brake arm 14 on the first fastener 22. Similarly, the second coupling portion 16a further includes a second brake arm supporting unit 32 for rotatably supporting the second brake arm 16 on the second fastener 24. In the first embodiment, the first and second brake arm supporting units 30 and 32 are each constructed as disclosed in U.S. Patent Application Publication No. 2013-0341129, which is assigned to Shimano, Inc.

Figure 5:
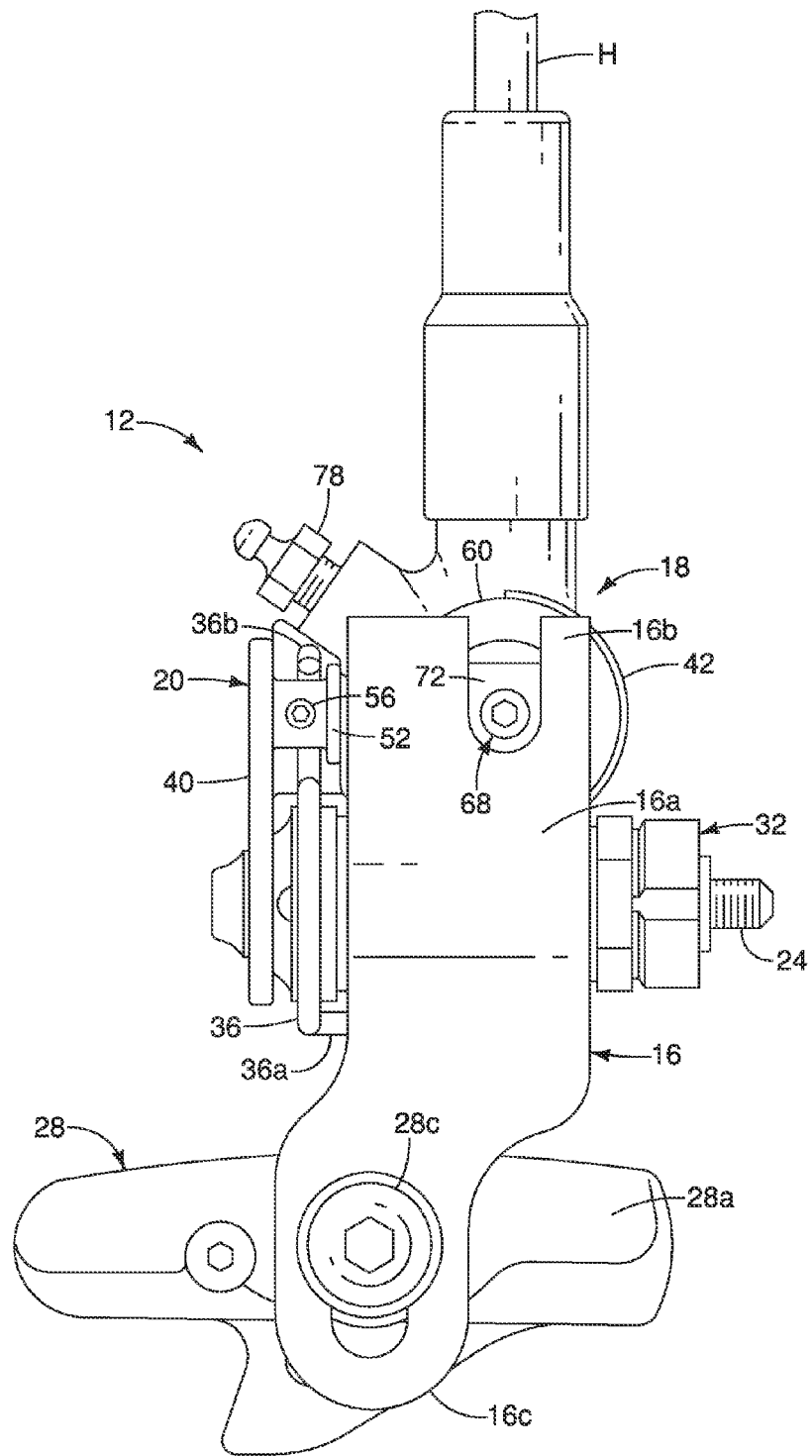
FIG. 5 is a side elevational view of the bicycle rim brake illustrated in FIGS. 1 to 4 with the bicycle rim brake being in the non-braking position.
Figure 8:
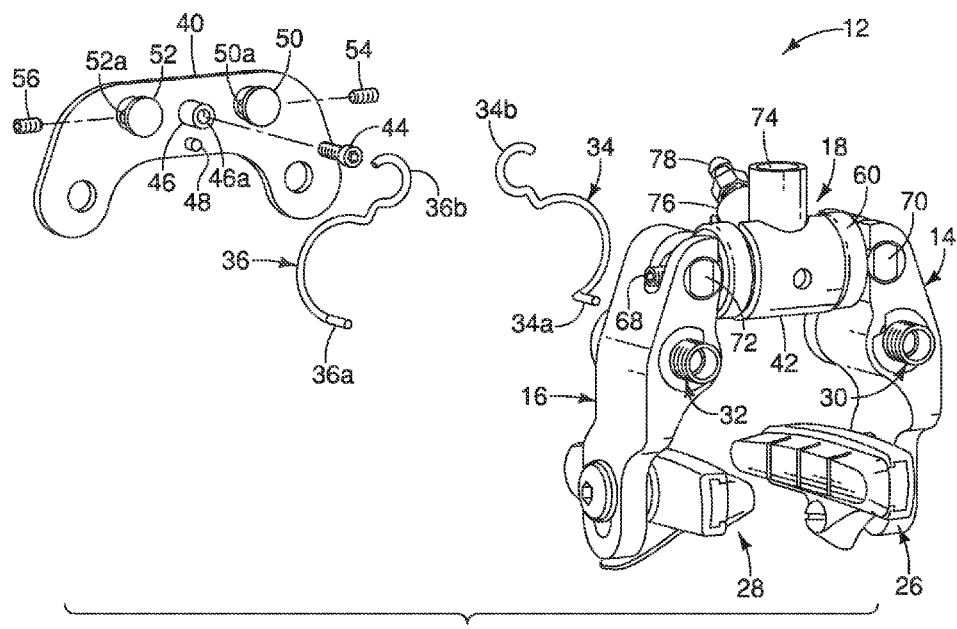
FIG. 8 is another partially exploded perspective view of selected parts of the bicycle rim brake illustrated in FIGS. 1 to 6.

Referring to FIGS. 5, 6 and 8, the first and second brake arms 14 and 16 are each biased to their non-braking positions, which constitute resting positions of the first and second brake arms 14 and 16. In more detail, the bicycle rim brake 12 comprises a first return spring 34 and a second return spring 36. The first return spring 34 biases the first brake arm 14 about the first pivot axis P1 towards the non-braking position. The second return spring 36 biases the second brake arm 16 about the second pivot axis P2 towards the non-braking position. The first return spring 34 has a first end portion 34a and a second end portion 34b. The first end portion 34a of the first return spring 34 is mounted in an opening in the first brake arm 14, while the second end portion 34b is hooked onto the support member 20. Similarly, the second return spring 36 has a first end portion 36a and a second end portion 36b. The first end portion 36a of the second return spring 36 is mounted in an opening in the second brake arm 16, while the second end portion 36b is hooked onto the support member 20.

Still referring to FIGS. 5, 6 and 8, the support member 20 includes a cross member 40. The cross member 40 of the support member 20 is coupled to the first and second coupling portions 14a and 16a, and maintains the first and second pivot axes P1 and P2 at a prescribed distance D apart from each other as seen in FIG. 6. The cross member 40 has a first opening 40a for receiving the first mounting fastener 22 therethrough, and a second opening 40b for receiving the second mounting fastener 24 therethrough.

The support member 20 further includes a holder 42. The holder 42 is supported on the rear side of the cross member 40. Here, a screw 44 is provided to attach the holder 42 to the cross member 40. The cross member 40 and the holder 42 are each a rigid member that is made of a suitable rigid material such that as aluminum or carbon fiber. In the first embodiment, the cross member 40 and the holder 42 are separate pieces. However, the cross member 40 and the holder 42 can be formed as a one-piece member of a single unitary material.

As explained below, the holder 42 is configured to support the hydraulic actuation device 18 on the first and second brake arms 14 and 16 via the cross member 40 with a toolless connection so that the hydraulic actuation device 18 can be removed and reinstalled from the holder 42. In this way, the hydraulic actuation device 18 can be removed from the holder 42 and then reinstalled without detaching the first and second brake arms 14 and 16 from the front fork 2.

As seen in FIGS. 6 and 8, a mounting boss 46 extends from the rear side of the cross member 40 into a mounting opening 42a of the holder 42. The mounting boss 46 has a threaded bore 46a. The screw 44 is screwed into the threaded bore 46a for attaching the holder 42 to the cross member 40. Also an anti-rotation protrusion 48 extends from the rear side of the cross member 40 and engages an anti-rotation opening 42b of the holder 42. The holder 42 includes a recess 42c that receives the hydraulic actuation device 18. As explained below, the hydraulic actuation device 18 is snap-fitted into and out of the recess 42c for installing and detaching the hydraulic actuation device 18 with respect the first and second brake arms 14 and 16.

As seen in FIGS. 6 and 8, the rear side of the cross member 40 has a first spring attachment projection 50 and a second spring attachment projection 52. The first spring attachment projection 50 is a headed pin for attaching the second end portion 34b of the first return spring 34. In the first embodiment, the biasing forces of the first and second return springs 34 and 36 are adjustable. Specifically, the first spring attachment projection 50 is provided with a threaded hole 50a. The threaded hole 50a threadedly receives a first adjustment member 54 that is arranged to adjust a biasing force of the first return spring 34. The second spring attachment projection 52 is a headed pin for attaching the second end portion 36b of the second return spring 36. The second spring attachment projection 52 is provided with a threaded hole 52a. The threaded hole 52a threadedly receives a second adjustment member 56 that is arranged to adjust a biasing force of the second return spring 38 independently of the first adjustment member 54. In the first embodiment, the first and second adjustment members 54 and 56 are set screws. By independently screwing in or unscrewing the first and second adjustment members 54 and 56 a user can independently adjust the biasing forces of the first and second return springs 34 and 36. However, the first and second adjustment members 54 and 56 can have other configurations such as cams that independently rotate on the first and second spring attachment projections 50 and 52 for change the position of the first and second end portions 34b and 36b of the first and second return springs 34 and 36.

Now, the hydraulic actuation device 18 will be described in more detail. Basically, the hydraulic actuation device 18 is supported on the support member 20, and is operatively coupled to the first and second actuated portions 14b and 16b of the first and second brake arms 14 and 16. The hydraulic hose H is connected between a conventional hydraulic actuating device (e.g., a brake lever), which is not shown, and the hydraulic actuation device 18. The hydraulic hose H supplies hydraulic fluid to the hydraulic actuation device 18 in response to operation of the conventional hydraulic actuating device (e.g., a brake lever).

Figure 11:
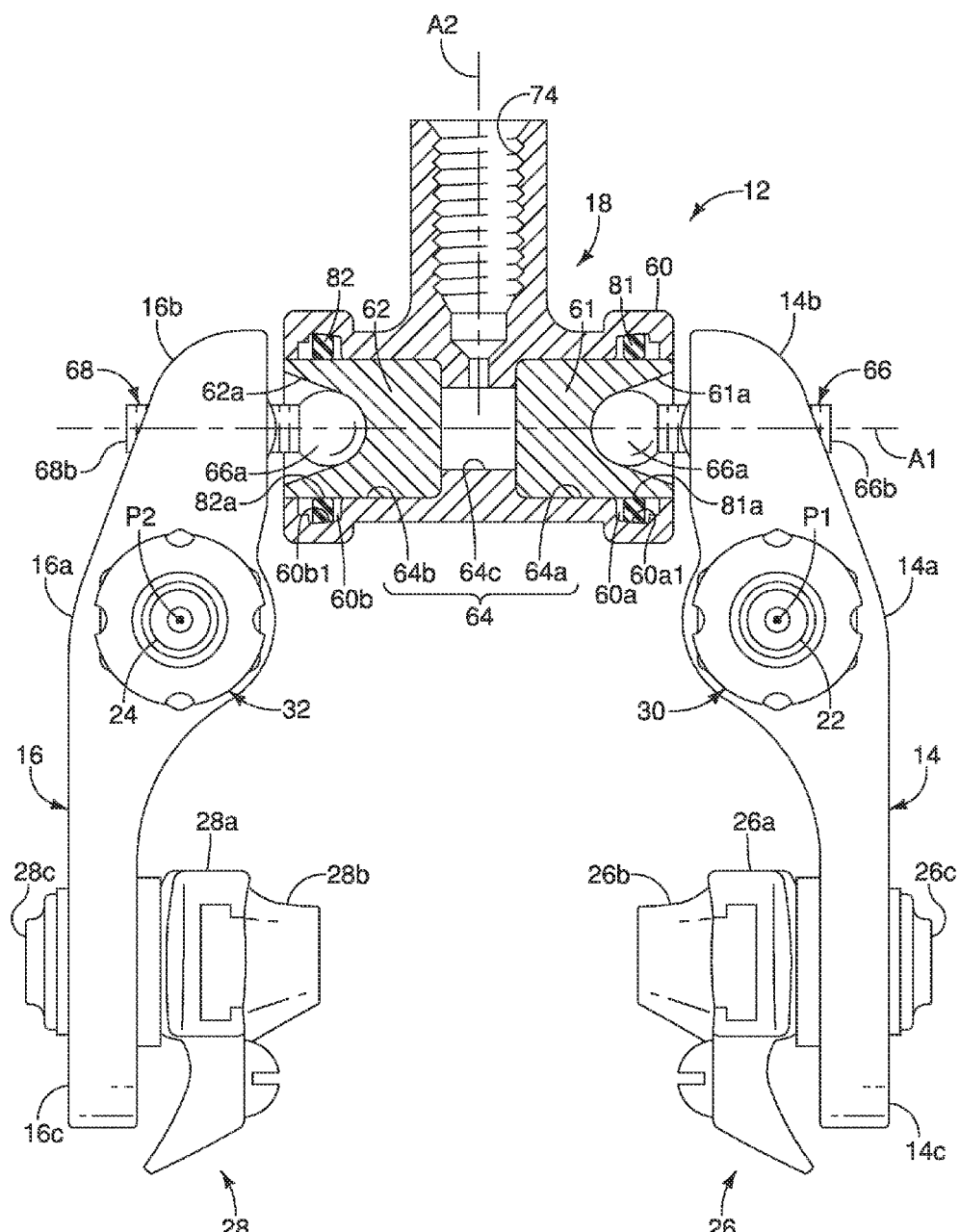
FIG. 11 is a front elevational view of the bicycle rim brake illustrated in FIGS. 1 to 6 with portions of the hydraulic actuation device shown in longitudinal cross section.

As seen in FIG. 11, the hydraulic actuation device 18 includes a cylinder housing 60, a first piston 61 and a second piston 62. The cylinder housing 60 defines a hydraulic chamber 64. The first piston 61 is movably disposed in the hydraulic chamber 64. The hydraulic chamber 64 includes a first chamber 64a, a second chamber 64b and a third chamber 64c. The first chamber 64a has the first piston 61 disposed therein. The second chamber 64b has the second piston 62 disposed therein. The third chamber 64c is provided between the first and second chambers 64a and 64b. The third chamber 64c has smaller diameter than the first and second chambers 64a and 64b. With this arrangement, the hydraulic hose H supplies hydraulic fluid to the third chamber 64c to simultaneously actuate the first and second pistons 61 and 62.

The exterior dimensions of the cylinder housing 60 are such that the cylinder housing 60 snaps into and out of the recess 42c of the holder 42. In this way, the hydraulic actuation device 18 can be removed and reinstalled with respect to the first and second brake arms 14 and 16 without a tool. In particular, the holder 42 is configured to have elasticity such that the cylinder housing 60 is snap-fitted into the recess of the holder 42. In other words, the exterior of the cylinder housing 60 is dimensioned slightly larger than the opening of the recess 42c of the holder 42. As a result, the holder 42 elastically deformed as the cylinder housing 60 of the hydraulic actuation device 18 is push into the recess 42c of the holder 42 or pulled out of the recess 42c of the holder 42. In this way, the recess 42c of the holder 42 receives the cylinder housing 60 of the hydraulic actuation device 18, and is retained in the recess 42c of the holder 42.

The first piston 61 is movably disposed in the hydraulic chamber 64. The first piston 61 is operatively coupled to the first actuated portion 14b of the first brake arm 14. In particular, the hydraulic actuation device 18 includes a first connecting rod 66 that connects the first actuated portion 14b of the first brake arm 14 to the first piston 61. Thus, the first actuated portion 14b of the first brake arm 14 is operatively coupled to the first piston 61 via the first connecting rod 66. The second piston 62 is movably disposed in the hydraulic chamber 64. The second piston 62 is operatively coupled to the second actuated portion 16b of the second brake arm 16. In particular, the hydraulic actuation device 18 includes a second connecting rod 68 that connects the first actuated portion 16b of the second brake arm 16 to the second piston 62. Thus, the second actuated portion 16b of the second brake arm 16 is operatively coupled to the second piston 62 via the second connecting rod 68.

As mentioned above, the first return spring 34 biases the first brake arm 14 about the first pivot axis P1 towards the first piston 61. Thus, the first connecting rod 66 applies a pushing force on the first piston 61 as a result of the biasing force of the first return spring 30 acting on the first brake arm 14. As also mentioned above, the second return spring 36 biases the second brake arm 16 about the second pivot axis P2 towards the second piston 62. Thus, the second connecting rod 68 applies a pushing force on the second piston 62 as a result of the biasing force of the second return spring 32 acting on the second brake arm 16.

Figure 9:
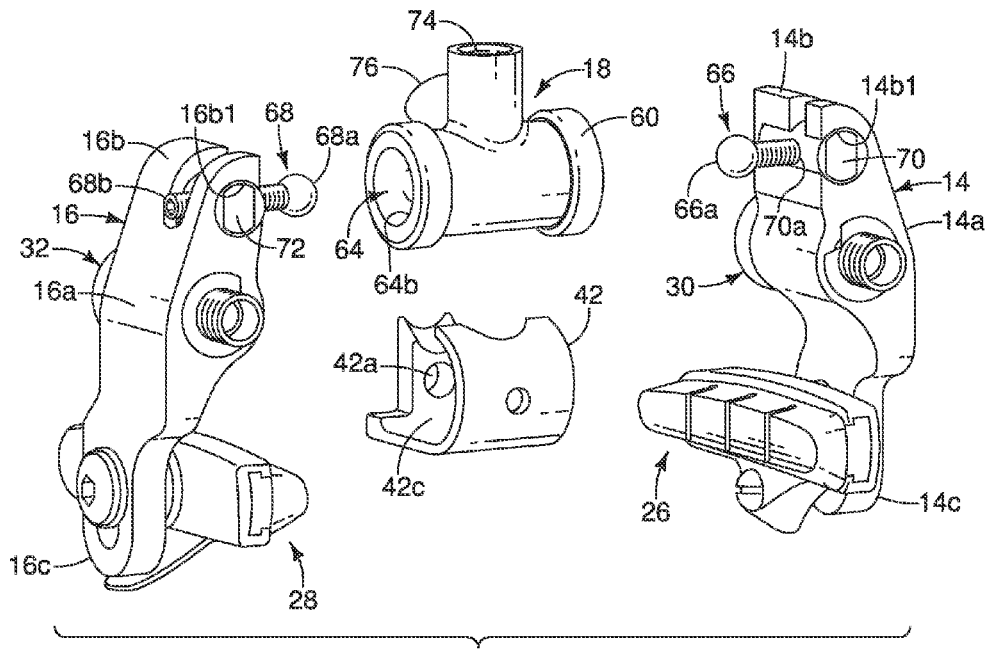
FIG. 9 is another partially exploded perspective view of selected parts of the bicycle rim brake illustrated in FIGS. 1 to 6 as viewed from the rear side of the bicycle rim brake.
Figure 10:
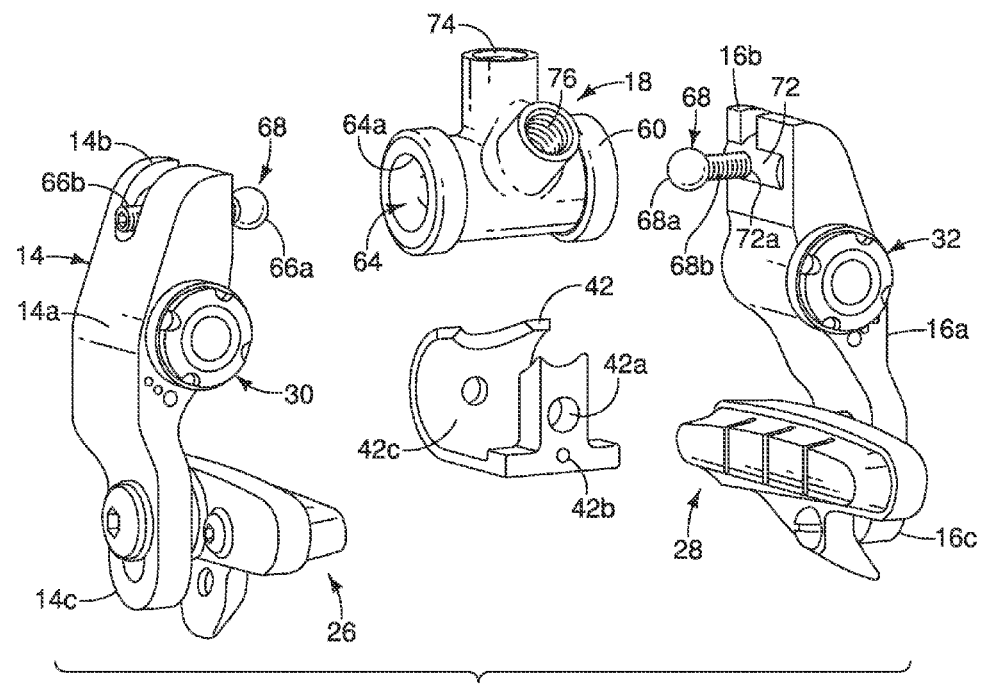
FIG. 10 is another partially exploded perspective view of selected parts of the bicycle rim brake illustrated in FIGS. 1 to 6 as viewed from the front side of the bicycle rim brake.

As seen in FIGS. 9 to 11, the first connecting rod 66 has a first end portion 66a that is connected to the first piston 61 and a second end portion 66b that is connected to the first actuated portion 14b. The first end portion 66a of the first connecting rod 66 is configured to be pivotally and detachably coupled to the first piston 61. In the first embodiment, the first end portion 66a of the first connecting rod 66 includes a partially spherical part or ball that is received in a recess or socket 61a of the first piston 61. The first connecting rod 66 is pivotally connected to the first brake arm 14. The first connecting rod 66 includes a first pivot pin 70 that is disposed in a first socket 14b1 of the first actuated portion 14b of the first brake arm 14. The first connecting rod 66 is adjustably connected to the first brake arm 14. In the first embodiment, the second end portion 66b of the first connecting rod 66 is threaded. The second end portion 66b is screwed into a threaded hole 70a of the first pivot pin 70 for adjustably coupling the first connecting rod 66 to the first brake arm 14. The end of the second end portion 66b has a tool receiving recess for rotating the first connecting rod 66 to adjust the resting position of the first brake arm 14. In this way, the first connecting rod 66 is configured to remain attached to the first brake arm 14 in a state where the hydraulic actuation device 18 is removed.

As seen in FIGS. 9 to 11, the second connecting rod 68 has a first end portion 68a that is connected to the second piston 62 and a second end portion 68b that is connected to the second actuated portion 16b. The second connecting rod 68 is pivotally connected to the second brake arm 16. The first end portion 68a of the second connecting rod 68 is configured to be pivotally and detachably coupled to the second piston 62. In the first embodiment, the first end portion 68a of the second connecting rod 68 includes a partially spherical part or ball that is received in a recess or socket 61a of the second piston 62. The second connecting rod 68 includes a second pivot pin 72 that is disposed in a second socket 16b1 of the second actuated portion 16b of the second brake arm 16. The second connecting rod 68 is adjustably connected to the second brake arm 16. In the first embodiment, the second end portion 68b of the second connecting rod 68 is threaded. The second end portion 68b is screwed into a threaded hole 72a of the second pivot pin 72 for adjustably coupling the second connecting rod 68 to the second brake arm 16. The end of the second end portion 68b has a tool receiving recess for rotating the second connecting rod 68 to adjust the resting position of the second brake arm 16. In this way, the second connecting rod 68 is configured to remain attached to the second brake arm 16 in a state where the hydraulic actuation device 18 is removed.

Figure 16:
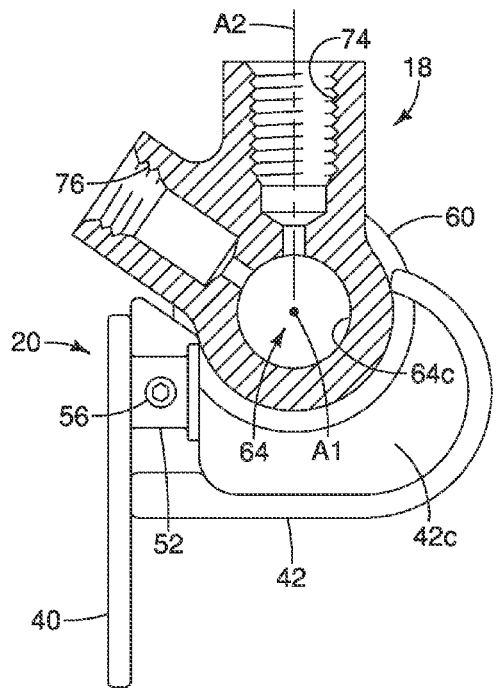
FIG. 16 is a side elevational view of the support member and the holder of the bicycle rim brake illustrated in FIGS. 1 to 6 with the cylinder housing of the hydraulic actuation device shown in cross section and the cylinder housing of the hydraulic actuation device partially remove from the holder of the bicycle rim brake.
Figure 17:
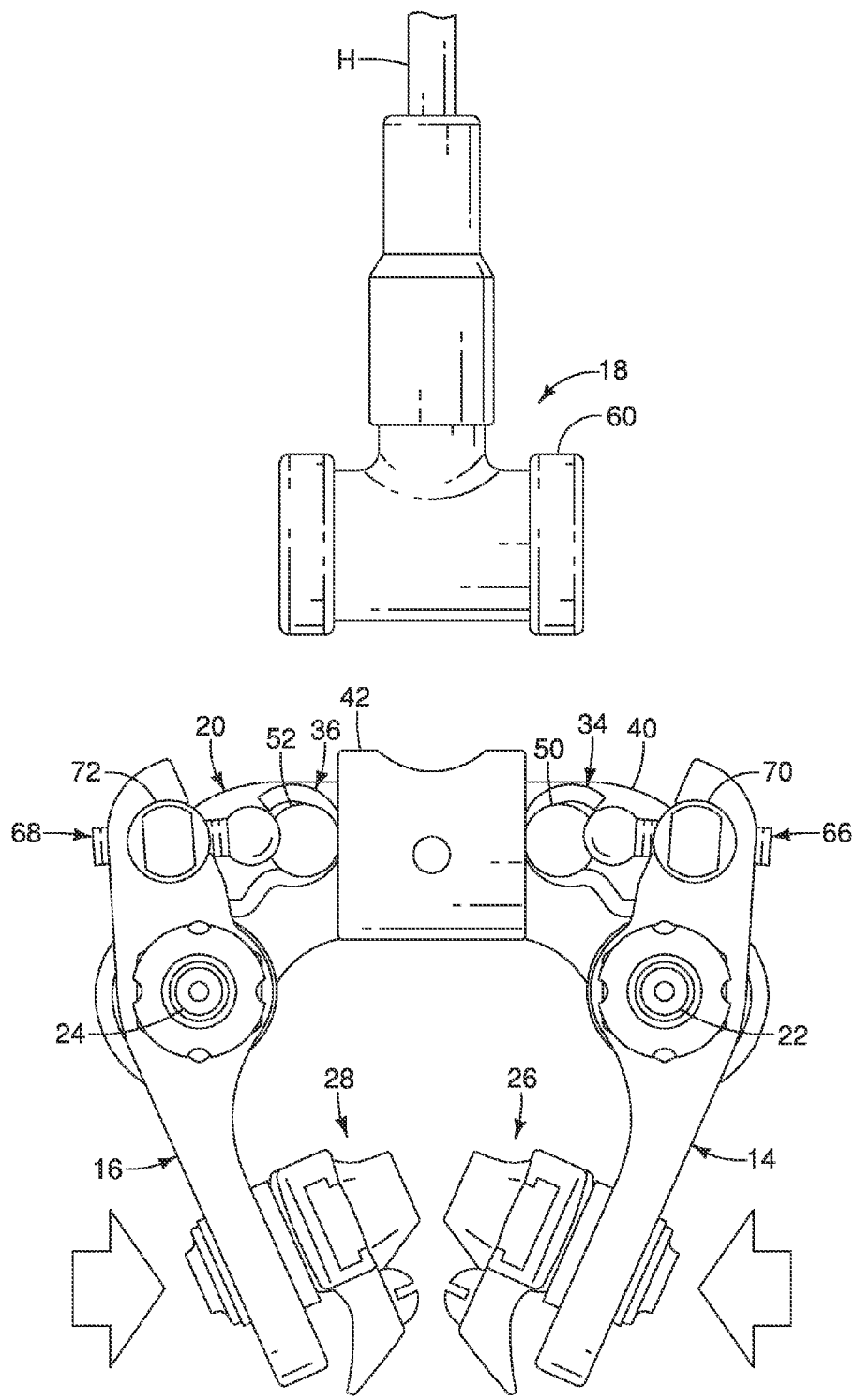
FIG. 17 is a rear elevational view of the bicycle rim brake illustrated in FIGS. 1 to 6 with the first and second brake arms held in the position for removing the hydraulic actuation device and the hydraulic actuation device removed from the holder of the bicycle rim brake.

As seen in FIGS. 11 and 16, the cylinder housing 60 includes an inlet bore 74 fluidly communicating with the hydraulic chamber 64 at a location between the first and second pistons 61 and 62. In particular, the inlet bore 74 fluidly communicates with the third chamber 64c of the hydraulic chamber 64 to supply hydraulic fluid thereto for moving the first and second pistons 61 and 62 within the first and second chamber 64a and 64b of the hydraulic chamber 64. The first and second pistons 61 and 62 are movable along an actuation axis A1 of the hydraulic chamber 64. The inlet bore 74 has a center longitudinal axis A2 that is perpendicularly arranged with respect to the actuation axis A1 of the hydraulic chamber 64.

As seen in FIGS. 11 to 14, the hydraulic actuation device 18 includes a first sealing member 81 that is provided on the cylinder housing 60 so as to at least partially support the first piston 61 in the hydraulic chamber 64. As seen in FIG. 11, the hydraulic actuation device 18 includes a second sealing member 82 that is provided on the cylinder housing 60 so as to at least partially support the second piston 62 in the hydraulic chamber 64. The first and second sealing members 81 and 82 are identical in the first embodiment. The cylinder housing 60 has a first annular recess 60a and a second annular recess 60b. The first sealing member 81 is disposed in the first annular recess 60a and protrudes from the first annular recess 60a so as to support the first piston 61. The second sealing member 82 is disposed in the second annular recess 60b and protrudes from the second annular recess 60b so as to support the second piston 62. The first and second annular recesses 60a and 60b are identical, except that they are mirror images in the first embodiment. The first and second annular recesses 60a and 60b are provided with sufficient axial dimensions so that the first and second sealing members 81 and 82 can deflect in the axial direction along the actuation axis A1 during movement of the first and second pistons 61 and 62 before contacting the cylinder housing 60. The first annular recess 60a has a trapezoidaly shaped cross-sectional profile which has a first outer surface 60a1 that expands in diameter as the first outer surface 60a1 approaches toward the first actuated portion 14b of the first brake arm 14. The first annular recess 60a further includes a first axial wall end wall 60a2, a second axial end wall 60a3 and a first outer surface 60a4 contacting the first and second axial end walls 60a2 and 60a3. The second axial end wall 60a3 is disposed closer to the second brake arm 16 than the first axial end wall 60a2. The second annular recess 60b has a trapezoidaly shaped cross-sectional profile which has a second outer surface 60b1 that expands in diameter as the second outer surface 60b1 approaches toward the second actuated portion 16b of the second brake arm 16. Thus, the first and second outer surfaces 60a1 and 60b1 are angled with respect to the actuation axis A1 such that the outer diameters of the first and second annular recesses 60a and 60b increases the farther that the first and second annular recesses 60a and 60b are from the center longitudinal axis A2 of the inlet bore 74. The phrase "trapezoidal shaped cross-sectional profile" as used herein with respect to the first and second annular recesses 60a and 60b refers to an overall shape of each recess as being trapezoidal with two parallel and two nonparallel sides, and in which the corners can be rounded and/or cutoff at an angle as well as one or more of the sides be non-planar.

The first sealing member 81 is made of a flexible, resilient or elastic material such as a rubber material suitable for hydraulic applications. The second sealing member 82 is made of an elastic material that is the same as the first sealing member 81. The first and second sealing members 81 and 82 create seals between the cylinder housing 60 and the first and second pistons 61 and 62 to prevent hydraulic fluid from leaking out of the hydraulic chamber 64 past the first and second pistons 61 and 62. The first sealing member 81 is an O-ring having a rectangularly shaped cross-sectional profile with a cylindrical inner surface 81a contacting the first piston 61. The second sealing member 82 is an O-ring having a rectangularly shaped cross-sectional profile with a cylindrical inner surface 82a contacting the second piston 62. The phrase "cross-sectional profile" as used herein with respect to the first and second sealing members 81 and 82 refers to just a transverse cross section of a segment of the sealing members as shown in cross section in FIGS. 12 to 14. The phrase "cross-sectional profile" as used herein with respect to the first and second sealing members 81 and 82 does not refers a transverse cross section of the entire sealing member. The phrase "rectangularly shaped" as used herein with respect to the first and second sealing members 81 and 82 refers to an overall shape that is rectangular having four planar sides with opposite sides being parallel, and in which the corners can be rounded and/or cutoff at an angle.

Figure 12:
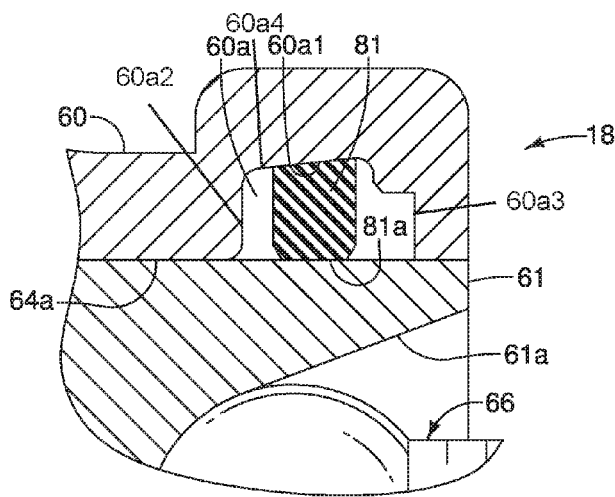
FIG. 12 is a cross sectional view of a portion of the hydraulic actuation device of the bicycle rim brake illustrated in FIGS. 1 to 6 showing one of the sealing members in a non-actuated position.
Figure 13:
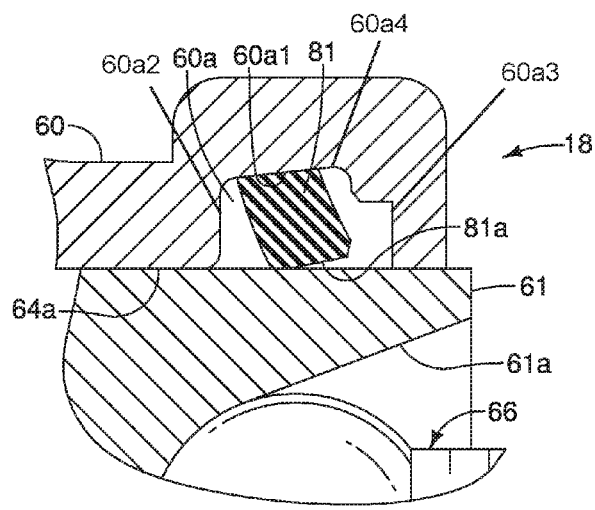
FIG. 13 is a cross sectional view of the portion of the hydraulic actuation device illustrated in FIG. 12, but with the piston and the sealing member in actuated positions.
Figure 14:
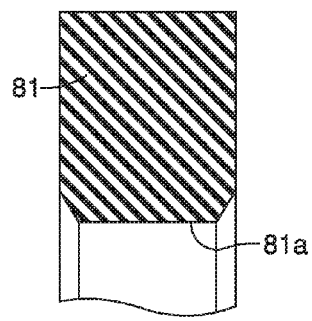
FIG. 14 is an enlarged cross sectional profile of a portion of one of the sealing members of the hydraulic actuation device of the bicycle rim brake illustrated in FIGS. 1 to 6.
Figure 15:
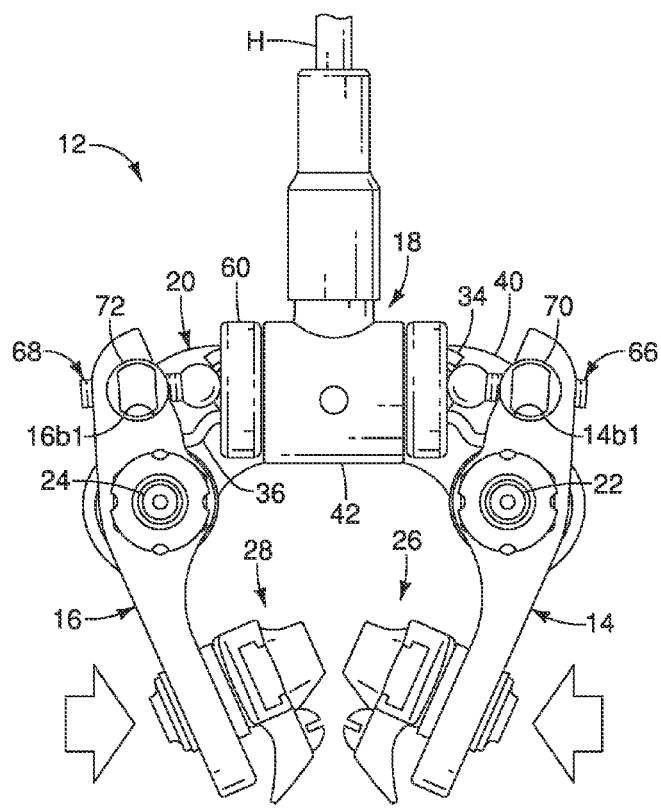
FIG. 15 is a rear elevational view of the bicycle rim brake illustrated in FIGS. 1 to 6 with the first and second brake arms held in a position for removing the hydraulic actuation device.

Referring to FIGS. 12 to 14, the first and second sealing members 81 and 82 are configured to provide an automatic adjustment of the brake pad clearances between the bicycle rim R and the brake pads 26b and 28b after actuation of the bicycle rim brake 12. In particular, after actuation when the brake lever returns to a rest position, the first and second sealing members 81 and 82 return the first and second pistons 61 and 62 back to their initial positions thereby providing a running clearance between the bicycle rim R and the brake pads 26b and 28b. More specifically, when the first piston 61 is moved axially in the hydraulic chamber 64 along the actuation axis A1 from a resting position (FIG. 12) to an actuated position (FIG. 13), the first sealing member 81 is deflected in the axial direction as seen in FIG. 13. In the actuated position of FIG. 13, the first sealing member 81 is temporarily deformed. The resulting deformation of the first sealing member 81 results in the first sealing member 81 applying a piston restoring force on the first piston 61. Thus, once the hydraulic pressure is reduced in the hydraulic chamber 64, the first sealing member 81 will act on the first piston 61 to return the first piston 61 to the resting position as seen in FIG. 12.

Before any wear occurs in the brake pads 26b and 28b, movement of the first piston 61 causes the first sealing member 81 to deflect but the first piston 61 does not slide on the first sealing member 81. Upon wear occurring in the brake pads 26b and 28b, actuation of the first piston 61 will result in the first sealing member 81 to be first deflected and then the first piston 61 will slide on the first sealing member 81 to counteract the wear in the brake pads 26b and 28b. Thus, a new resting position is established when the first sealing member 81 acts on the first piston 61 to return the first piston 61 to the resting position. The second sealing member 82 operates in the same way as the first sealing member 81.

Figure 18:
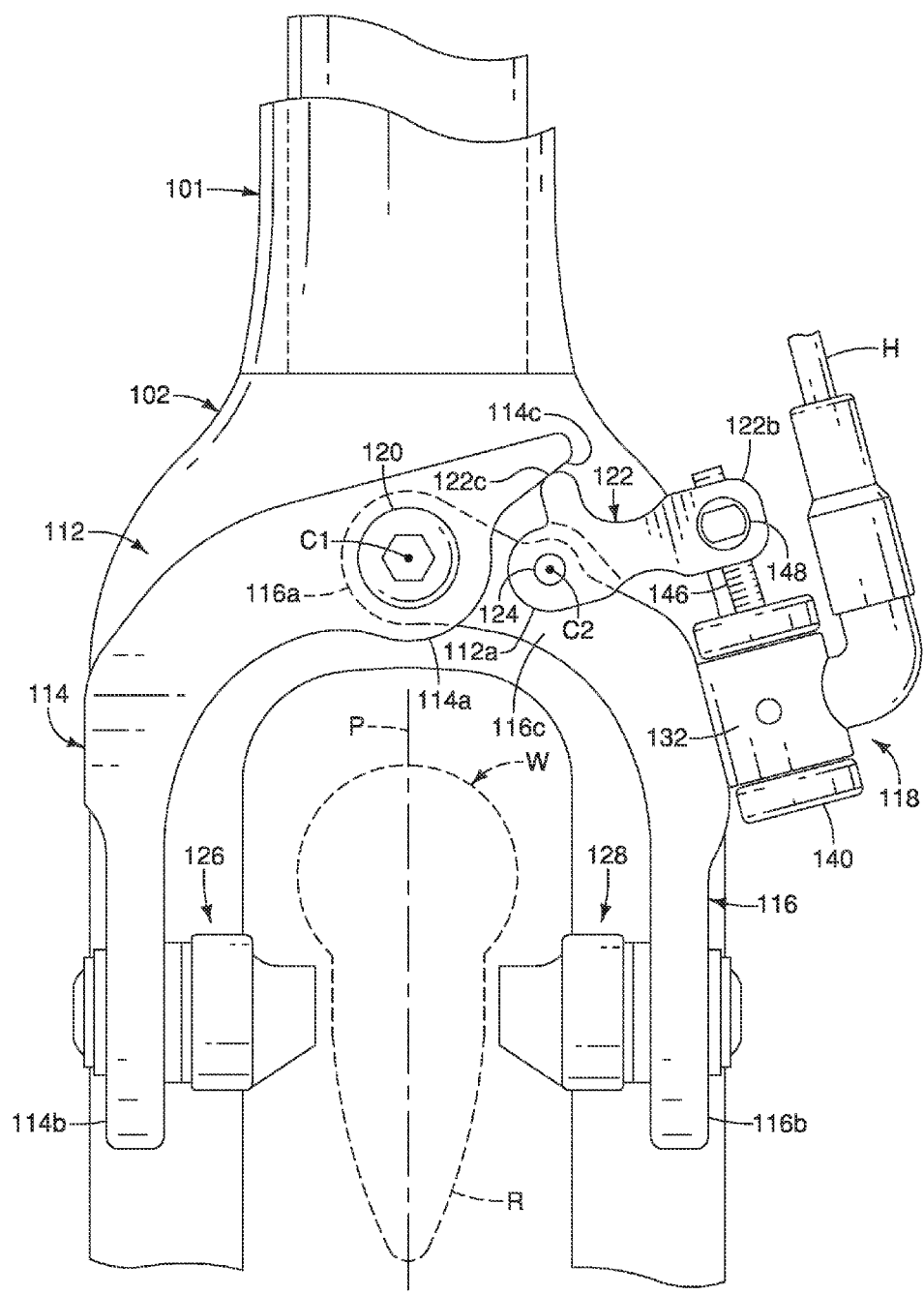
FIG. 18 is a front elevational view of a portion of a bicycle equipped with a bicycle rim brake in accordance with a second embodiment, with the bicycle rim brake being in a non-braking position or resting position.
Figure 19:
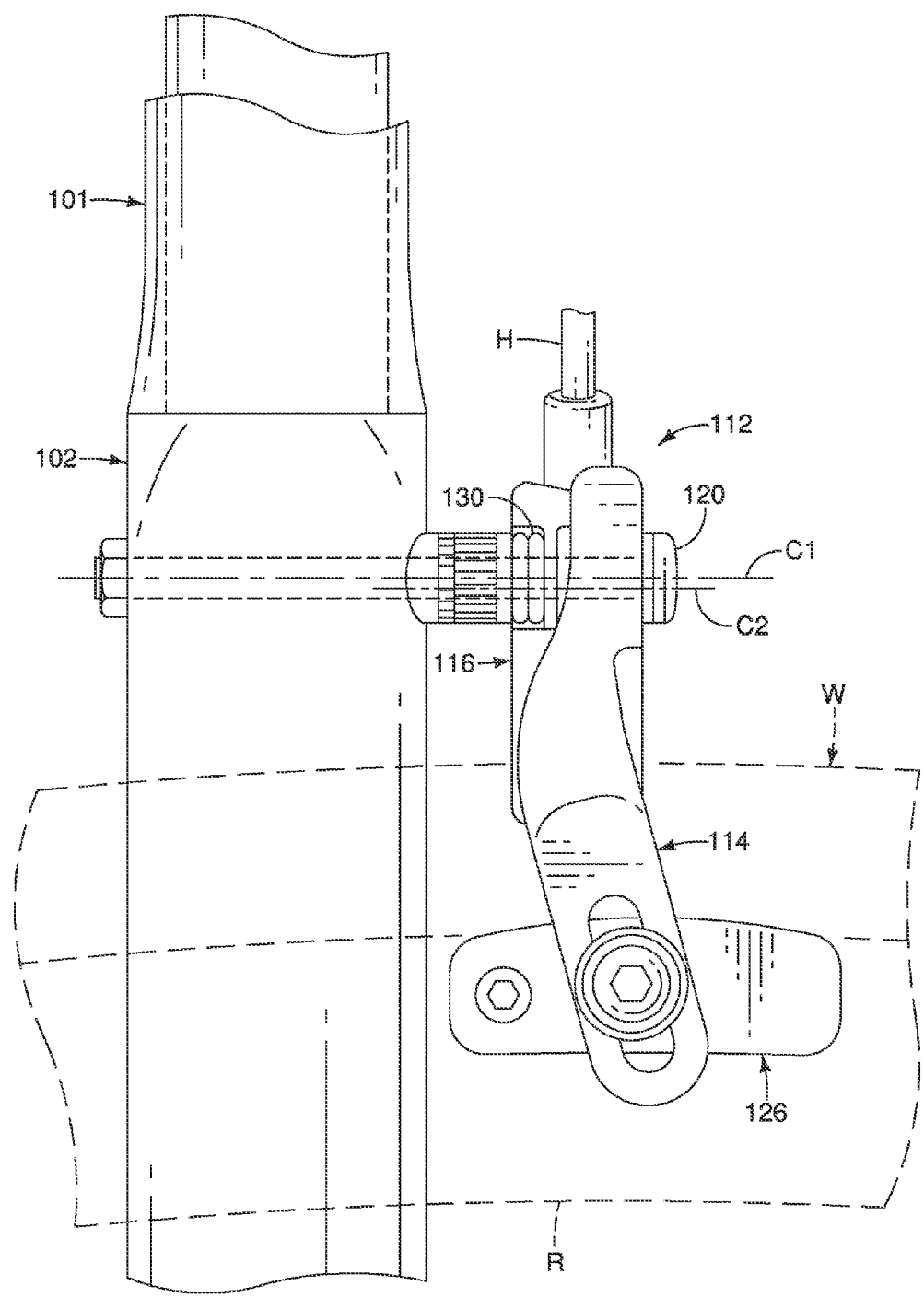
FIG. 19 is a side elevational view of the portion of the bicycle and the bicycle rim brake illustrated in FIG. 18.
Figure 20:
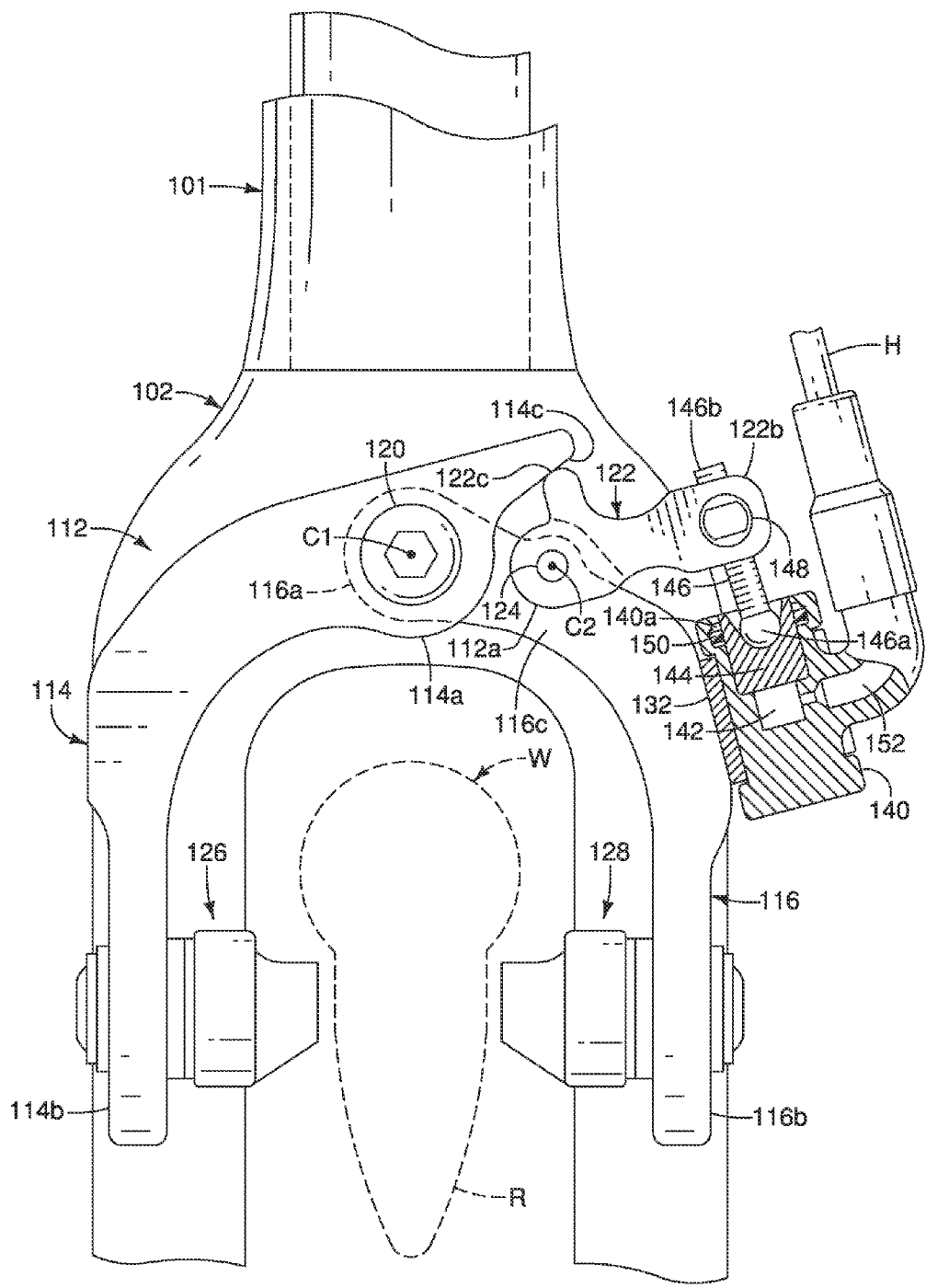
FIG. 20 is a front elevational view, similar to FIG. 18, of the portion of the bicycle and the bicycle rim brake illustrated in FIGS. 18 and 19, but with portions shown in cross-sectional to illustrate selected parts of the hydraulic actuation device with the bicycle rim brake in the non-braking position or resting position.

Referring now to FIGS. 18 to 20, a portion of a bicycle 101 having a front fork 102 is illustrated that is equipped with a bicycle rim brake 112 in accordance with a second embodiment. Here, the bicycle rim brake 112 basically comprises a first brake arm 114, a second brake arm 116 and a hydraulic actuation device 118. The bicycle rim brake 112 further comprises a single mounting fastener 120 that pivotally connects the first and second brake arms 114 and 116 together about the first pivot axis C1. The second embodiment differs from the first embodiment in that the first and second brake arms 114 and 116 both pivot about the first pivot axis C1. The bicycle rim brake 112 further comprises an actuation link 122 that is pivotally mounted on the second brake arm 116 by a pivot pin 124 about a second pivot axis C1 that is offset from the first pivot axis C1. The bicycle rim brake 112 further comprises a first friction member 126 mounted to the first brake arm 114 and a second friction member 128 mounted to the second brake arm 116.

As seen in FIG. 19, preferably, the bicycle rim brake 112 further includes a biasing member 130. In this embodiment, the biasing member 130 is a torsion spring. The biasing member 130 has a coiled portion disposed around the mounting member 120 and a pair of free ends engaging the first and second brake arms 114 and 116, respectively. The first and second brake arms 114 and 116 are biased to the non-braking position or resting position (FIG. 18). Thus, the brake pads of the first and second friction members 126 and 128 are held in a preloaded open state by the biasing member 130.

In this embodiment, the hydraulic actuation device 118 is mounted to the second brake arm 116 by a support member 132. The support member 132 is identical to the holder 42 of the first embodiment, except that the support member 132 is mounted directly to the second brake arm 116 by a fastener (not shown). In other words, the support member 132 is identical to the holder 42 except that the locations the mounting opening 42a and the anti-rotation opening 42b are located such that the mounting opening of the support member 132 aligns with a threaded hole of the second brake arm 116 and the anti-rotation opening of the support member 132 directly engage the anti-rotation protrusion of the second brake arm 116 Thus, same as the first embodiment, the hydraulic actuation device 118 is snap-fitted into and out of the support member 132 for installing and detaching the hydraulic actuation device 118 with respect the first and second brake arms 114 and 116.

Now, the hydraulic actuation device 118 will be described in more detail. Basically, the hydraulic actuation device 118 is supported on the support member 132, and is operatively coupled to the first and second brake arms 114 and 116 via the actuation link 122. The hydraulic actuation device 118 includes a cylinder housing 140 defining a hydraulic chamber 142, a piston 144 and a connecting rod 146. The piston 144 and the connecting rod 146 are identical to the first piston 61 and the first connecting rod 66. Thus, the connecting rod 146 has a first end portion 146a engaged with the piston 144 and a second end portion 146b adjustably engaged with a pivot pin 148 that is rotatably mounted to the actuation link 122.

The hydraulic actuation device 118 further includes a first sealing member 150 that is provided on the cylinder housing 140 so as to at least partially support the first piston 144 in the hydraulic chamber 142. The first sealing member 150 is identical to the first sealing member 81 of the first embodiment. The first sealing member 150 is disposed in an annular recess 140a of the cylinder housing 140. The annular recess 140a and the first sealing member 150 are configured to provide an automatic adjustment of the brake pad clearances.

In the second embodiment, the bicycle rim brake 112 is hydraulically actuated by a conventional hydraulic actuating device (e.g., a brake lever), which is not shown. The hydraulic hose H is connected to an inlet bore 152 to supply hydraulic fluid to the hydraulic chamber 142. Basically, the hydraulic fluid in the hydraulic chamber 142 is pressurized by actuation of the conventional hydraulic actuating device (e.g., a brake lever), which moves the piston 144 inside the hydraulic chamber 142. This movement of the piston 144 moves the connecting rod 146 which in turn moves the actuation link 122. This movement of the actuation link 122 causes the first and second brake arms 114 and 116 to pivot about the first pivot axis C1 to apply a braking force to a bicycle wheel W by pinching a bicycle rim R of the bicycle wheel W.

The hydraulic actuation device 118 is identical to the hydraulic actuation device 18 of the first embodiment, except that the cylinder housing 140 has been modified to accommodate a single piston arrangement and the inlet bore 152 has an elbow shape. In view of the similarities between the hydraulic actuation devices 18 and 118, the hydraulic actuation device 118 will not be discussed and/or illustrated in detail for the sake of brevity.

Now, the first and second brake arms 114 and 116 will be discussed in more detail. The first and second brake arms 114 and 116 are each a rigid member made of a suitable rigid material that is typically used for bicycle brake arms. For example, the first and second brake arms 114 and 116 can be a cold-forged aluminum arm or a carbon fiber reinforced arm. As seen from the view in FIG. 18, the first brake arm 114 pivots about the first pivot axis C1 in a counterclockwise direction to contact the bicycle rim R, while the second brake arm 116 pivots about the first pivot axis C1 in a clockwise direction to contact the bicycle rim R. Thus, the first brake arm 114 pivots about the first pivot axis P1 in a clockwise direction to move away from the bicycle rim R, while the second brake arm 116 pivots about the first pivot axis C1 in a counterclockwise direction to move away from the bicycle rim R.

Basically, the first brake arm 114 has a first coupling portion 114a, a first mounting portion 114b and a projecting part 114c for contacting the actuation link 122. The projecting part 114c constitutes a first actuated portion of the first brake arm 114. The first coupling portion 114a is configured to pivot about the first pivot axis C1. The first coupling portion 114a is pivotally coupled to the mounting fastener 120, which pivotally mounts the first brake arm 114 with respect to the front fork 102. The first mounting portion 114b extends from the first coupling portion 114a. The first mounting portion 114b is configured to mount the first friction member 126, which is identical the first friction member 26 as discussed above. The projecting part 114c (the first actuated portion) contacts the actuation link 122 such that the pushing force of the hydraulic actuation device 118 is transmitted to the first brake arm 114 via the actuation link 122.

Basically, the second brake arm 116 has a second coupling portion 116a, a second mounting portion 116b and a second actuated portion 116c. The second coupling portion 116a is configured to pivot about the first pivot axis C1. The second coupling portion 116a is pivotally coupled to the mounting fastener 120, which pivotally mounts the second brake arm 116 with respect to the front fork 102. Thus, the mounting fastener 120 pivotally connects the first and second coupling portions 114a and 116a together. The second mounting portion 116b extends from the second coupling portion 116a. The second mounting portion 116b is configured to mount the second friction member 128, which is identical the second friction member 28 as discussed above. The second actuated portion 116c has an opening for mounting the pivot pin 124 so that pushing force of the hydraulic actuation device 118 is transmitted to the second brake arm 116 via the actuation link 122.

The actuation link 122 will now be discussed in more detail. The actuation link 122 is a rigid member made of a suitable rigid material such as the material that is used for the first and second brake arms 114 and 116. For example, the actuation link 122 can be formed of an aluminum alloy or a carbon fiber reinforced material. The actuation link 122 serves as a connecting structure between the first and second brake arms 114 and 116 and the hydraulic actuation device 118. The actuation link 122 has an attachment structure 122a, a coupling structure 122b and a contact portion 122c.

Here, the attachment structure 122a has a fork shape (a pair of flanges separated by a gap) that straddles the second actuated portion 116c of the second brake arm 116. Each flange of the attachment structure 122a has a hole that receives a pivot pin 124, which defines the second pivot axis C2. The ends of the pivot pin 124 are press fitted in the holes of the attachment structure 122a, respectively. Thus, the actuation link 122 is pivotally mounted to the second actuated portion 116c of the second brake arm 116 by the pivot pin 124.

The coupling structure 122b is configured to be coupled with the hydraulic actuation device 118. Here, the coupling structure 122b has a fork shape (a pair of flanges separated by a gap) that straddles the second end portion 146b of the connecting rod 146. Each flange of the coupling structure 122b has a hole that receives the pivot pin 148. The ends of the pivot pin 148 freely pivot within the holes of the coupling structure 122b, respectively. Thus, the pivot pin 148 forms a trunnion with respect to the actuation link 122. The second end portion 146b of the connecting rod 146 is screwed into a threaded hole (not shown) of the pivot pin 148 for adjustably coupling the connecting rod 146 to the actuation link 122.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rim brake. Accordingly, these directional terms, as utilized to describe the bicycle rim brake should be interpreted relative to a bicycle in an upright riding position on a horizontal surface and that is equipped with the bicycle rim brake. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim brake comprising:
   a first brake arm including a first coupling portion configured to pivot about a first pivot axis, a first actuated portion and a first mounting portion, the first mounting portion being configured to mount a first friction member and extending from the first coupling portion; and
   a hydraulic actuation device operatively coupled to the first actuated portion of the first brake arm, the hydraulic actuation device including a cylinder housing defining a hydraulic chamber and having a first annular recess, the first annular recess including a first axial end wall, a second axial end wall, and a first outer surface connecting the first and second axial end walls, the first and second axial end walls being oppositely facing walls of the first annular recess, the first outer surface being located radially outward of the first and second axial end walls, the second axial end wall being arranged closer to the first brake arm than the first axial end wall, a first piston movably disposed in the hydraulic chamber of the cylinder housing, and a first sealing member provided on the cylinder housing so as to at least partially support the first piston in the hydraulic chamber, the first sealing member being disposed in the first annular recess and protruding from the first annular recess between the first and second axial end walls so as to support the first piston in a hydraulic chamber, the first sealing member being spaced from the first and second axial end walls by a prescribed distance such that the first sealing member is spaced from the second axial end wall during operation of the first piston between a rest position and an actuated position.

2. The bicycle rim brake according to claim 1, wherein the first actuated portion and the first mounting portion are disposed on opposite sides of the first coupling portion.

3. The bicycle rim brake according to claim 1, further comprising
   a second brake arm including a second coupling portion configured to pivot about a second pivot axis, a second actuated portion and a second mounting portion, the second mounting portion being configured to mount a second friction member and extending from the second coupling portion.

4. The bicycle rim brake according to claim 3, wherein
   the first actuated portion and the first mounting portion are disposed on opposite sides of the first coupling portion, and
   the second actuated portion and the second mounting portion are disposed on opposite sides of the second coupling portion.

5. The bicycle rim brake according to claim 3, wherein
   the hydraulic actuation device further includes a second piston movably disposed in the hydraulic chamber of the cylinder housing, and a second sealing member provided on the cylinder housing so as to at least partially support the second piston in the hydraulic chamber.

6. The bicycle rim brake according to claim 5, wherein
   the cylinder housing has a second annular recess,
   the second sealing member being disposed in the second annular recess and protruding from the second annular recess so as to support the second piston.

7. The bicycle rim brake according to claim 5, wherein
   the first piston is operatively coupled to the first actuated portion of the first brake arm, and
   the second piston is operatively coupled to the second actuated portion of the second brake arm.

8. The bicycle rim brake according to claim 5, wherein
   the first sealing member is an O-ring made of an elastic material, and
   the second sealing member is an O-ring made of an elastic material.

9. The bicycle rim brake according to claim 8, wherein
   the first sealing member has a rectangularly shaped cross-sectional profile with a cylindrical inner surface contacting the first piston, and
   the second sealing member has a rectangularly shaped cross-sectional profile with a cylindrical inner surface contacting the second piston.

10. The bicycle rim brake according to claim 5, wherein
    the first annular recess has a trapezoidaly shaped cross-sectional profile which has the first outer surface that expands in diameter as the first outer surface approaches toward the first actuated portion of the first brake arm, and
    the second annular recess has a trapezoidaly shaped cross-sectional profile which has a second outer surface that expands in diameter as the second outer surface approaches toward the second actuated portion of the second brake arm.

11. The bicycle rim brake according to claim 3, further comprising
    a support member coupled to the first and second coupling portions and maintaining the first and second pivot axes at a prescribed distance apart from each other.

12. The bicycle rim brake according to claim 3, wherein the first coupling portion includes a first mounting fastener that is configured to be mounted to a bicycle and the second coupling portion includes a second mounting fastener that is configured to be mounted to the bicycle.

13. The bicycle rim brake according to claim 12, further comprising
a first return spring biasing the first brake arm about the first pivot axis towards the first piston, and
a second return spring biasing the second brake arm about the second pivot axis towards the second piston.

14. The bicycle rim brake according to claim 13, further comprising
a first adjustment member arranged to adjust a biasing force of the first return spring, and
a second adjustment member arranged to adjust a biasing force of the second return spring independently of the first adjustment member.

15. The bicycle rim brake according to claim 1, further comprising
a first return spring biasing the first brake arm about the first pivot axis towards the first piston.

16. The bicycle rim brake according to claim 15, further comprising
a first adjustment member arranged to adjust a biasing force of the first return spring.

17. The bicycle rim brake according to claim 1, wherein the first sealing member is an O-ring made of an elastic material.

18. The bicycle rim brake according to claim 17, wherein the first sealing member has a rectangularly shaped cross-sectional profile with a cylindrical inner surface contacting the first piston.

19. The bicycle rim brake according to claim 1, wherein the first annular recess has a trapezoidaly shaped cross-sectional profile which has a first outer surface that expands in diameter as the first outer surface approaches toward the first actuated portion of the first brake arm.

20. A bicycle rim brake comprising:
a first brake arm including a first coupling portion configured to pivot about a first pivot axis, a first actuated portion and a first mounting portion, the first mounting portion being configured to mount a first friction member and extending from the first coupling portion; and
a hydraulic actuation device operatively coupled to the first actuated portion of the first brake arm, the hydraulic actuation device including a cylinder housing defining a hydraulic chamber and having a first annular recess and an inlet bore, the inlet bore fluidly communicating with the hydraulic chamber, the first annular recess including a first axial end wall, a second axial end wall, and a first outer surface connecting the first and second axial end walls, the first and second axial end walls being oppositely facing walls of the first annular recess, the first outer surface being located radially outward of the first and second axial end walls, the second axial end wall being arranged closer to the first brake arm than the first axial end wall, a first piston movably disposed in the hydraulic chamber of the cylinder housing and being coupled to the first brake arm such that the first brake arm and the inlet bore are disposed on opposite sides of the hydraulic chamber with respect to each other, and a first sealing member provided on the cylinder housing so as to at least partially support the first piston in the hydraulic chamber, the first sealing member being disposed in the first annular recess and protruding from the first annular recess between the first and second axial end walls so as to support the first piston in a hydraulic chamber, the first sealing member being spaced from the second axial end wall by a prescribed distance such that the first sealing member is spaced from the second axial end wall during operation of the first piston between a rest position and an actuated position.

* * * * *